United States Patent [19]

Duchet et al.

[11] Patent Number: 5,652,808
[45] Date of Patent: Jul. 29, 1997

[54] ACOUSTIC-OPTICAL DEVICE FOR OPTICAL FILTERING

[75] Inventors: Christian Duchet, Marcoussis; Christian Brot, Leuville sur Orge; Michel Di Maggio, Bonnelles, all of France

[73] Assignee: Alcatel N.V., Rijswijk, Netherlands

[21] Appl. No.: 575,086

[22] Filed: Dec. 19, 1995

[30] Foreign Application Priority Data

Dec. 20, 1994 [FR] France .................. 94 15336

[51] Int. Cl.$^6$ .................. G02B 6/126; G02F 1/00
[52] U.S. Cl. .................. 385/7; 385/11
[58] Field of Search .................. 385/7, 11, 27, 385/1

[56] References Cited

U.S. PATENT DOCUMENTS

| 4,273,411 | 6/1981 | Alferness | 350/355 |
|---|---|---|---|
| 4,390,236 | 6/1983 | Alferness | 350/384 |
| 4,815,802 | 3/1989 | Nakamura | 385/7 |
| 5,002,349 | 3/1991 | Cheung et al. | 385/1 |
| 5,400,171 | 3/1995 | Song | 359/285 |

FOREIGN PATENT DOCUMENTS

| 5181098 | 7/1993 | Japan | 385/7 |
|---|---|---|---|
| 5333298 | 12/1993 | Japan | 385/7 |

OTHER PUBLICATIONS

Herrmann, H. et al, "Integrated Optical, TE–and TM–pass, Acoustically Tunable, Double–Stage Wavelength Filters in LiNbO/sub 3/", *Electronics Letters*, 26 Mar. 1992, vol. 28, No. 7, ISSN 0013–5194, pp. 642–644, XP 000291369.

Aronson, L. B. et al, "Reduced sidelobe integrated acous-to–optic filter with birefringence apodization", *Optics Letters*, 15 Oct. 1993, USA, vol. 18, No. 20, ISSN 0146–9592, pp. 1721–1723, XP 000398571.

Smith, D. A., et al, "Sidelobe suppression in an acousto–optic filter with a raised–cosine interaction strength", *Applied Physics Letters*, 31 Aug. 1992, USA, vol. 61, No. 9, ISSN 0003–6951, pp. 1025–1027 XP 000294446.

*Primary Examiner*—John D. Lee
*Assistant Examiner*—Ellen Eunjoo Kang
*Attorney, Agent, or Firm*—Sughrue, Mion, Zinn, Macpeak & Seas

[57] ABSTRACT

An acoustic-optical device for optical filtering includes two successive acoustic-optical interaction segments separated by an intermediate polarizer and each modifying the polarization of light guided by it. The modification depends on the frequencies of the interacting optical and acoustic waves. The acoustic waves are supplied symmetrically to the two interaction segments from a common electro-optical transducer. The transmission spectrum of the optical filter is subject to apodization by coupling between an auxiliary acoustic waveguide including the transducer and a main acoustic waveguide including the optical waveguide. Applications of the device include fiber optic telecommunication systems.

6 Claims, 1 Drawing Sheet ns, the ft ndd

5,652,808

1

ACOUSTIC-OPTICAL DEVICE FOR OPTICAL FILTERING

BACKGROUND OF THE INVENTION

1. Field of the Invention

The invention concerns optical filtering. Its applications include fibre optic telecommunication systems that transmit a plurality of streams of information simultaneously in the form of a spectral multiplex.

2. Description of the Prior Art

It is often necessary to be able to extract a selected one of the components of a multiplex of this kind. This requires an optical filter having the following properties:

high contrast between the transmission coefficients for optical waves in the passband of the filter and outside that band, and the facility to adjust the center optical frequency of that band.

Prior art devices utilize acoustic-optical interaction to implement these filters. They are described later. Unfortunately they do not have the above properties to a sufficient degree.

One object of the present invention is to provide a simple way to implement optical filters having these qualities to a greater degree than previously.

SUMMARY OF THE INVENTION

To this end, the present invention consists in an acoustic-optical device for optical filtering, including two successive acoustic-optical interaction segments separated by an intermediate polarizer and each modifying the polarization of light guided by said segment, said modification being dependent on the frequencies of interacting optical waves and acoustic waves, in which device said acoustic waves are supplied symmetrically to two interaction segments from a common electro-acoustic transducer.

Prior art devices and one example of one embodiment of the present invention are described below with reference to the appended drawings.

DETAILED DESCRIPTION OF THE PRIOR ART AND THE PREFERRED EMBODIMENT

Where a component of the prior art devices has the same function as a component of the device of the invention it is denoted by the same reference letter and/or number with a single quotation or a double quotation mark according to whether it relates to the first or the second prior art device. The word "corresponding" is used hereinafter in respect of such components.

Figure 3:
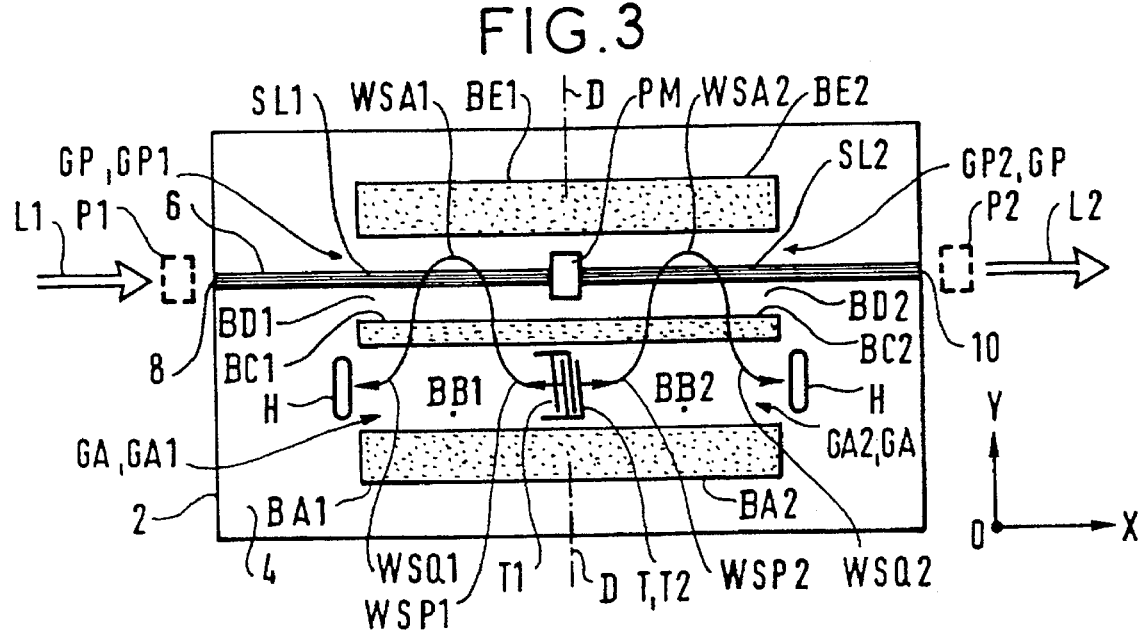
FIG. 3 shows device of the invention.

Certain components of the device of the invention are described first with reference to FIG. 3, these components being those that correspond to components of the first prior art device.

As shown in FIG. 3, the device of the invention comprises the following components:

A substrate 2 having one face, for example a horizontal face, constituting a top face 4 of the device. This substrate is typically made from an acoustic-optical material such as lithium niobate.

2

An optical waveguide 6 extends in this top face from an input 8 to an output 10. This waveguide is typically formed by diffusion of titanium ions into a surface layer of the substrate. It is adapted to receive at its input input light L1 made up of optical waves having the same input linear polarization but which can have different optical frequencies. It guides these waves in at least one direction and delivers all the waves to the output in the form of output light L2. The direction in which these waves are guided in each part of the waveguide constitutes a longitudinal direction OX for that part, the perpendicular direction in the top face of the substrate constituting a transverse direction OY. The waveguide is preferably rectilinear and thus defines a single longitudinal direction OX and a single transverse direction OY. It is birefringent and therefore the propagation speeds of TE and TM optical waves are different.

A directional acoustic system is integrated into the substrate. This system receives an electrical energization signal and forms in response thereto surface acoustic waves propagating in the substrate. These waves include active acoustic waves propagating longitudinally along the optical waveguide.

The acoustic-optical nature of the substrate is reflected in the existence of acoustic-optical coefficients. The substrate and the orientation of its top face and of the optical waveguides relative to the crystal lattice of the substrate give these coefficients values enabling an active acoustic wave to cause interaction resulting in coupling between the two guided optical modes TE and TM.

Each such acoustic-optical interaction occurs between an acoustic wave having an acoustic frequency fs and an optical wave having an optical frequency Fj. It leads to modification of the polarization of the optical wave, for example a change between the TE and TM modes, without substantially modifying its optical frequency. The modification of the polarization is dependent on the optical frequency Fj. It has a maximum where this optical frequency has a predetermined relationship to the acoustic frequency, to be more precise it satisfies the equation Fj=A fs. In this equation A is a factor defined by the equation A.vs.$\Delta$n=vl where vs and vl are the speeds of the acoustic waves and the guided light and $\Delta$n is the difference in refractive index representative of the birefringent nature of the optical waveguide. As a result, the optical waves of the output light can have different polarizations from each other and respectively constituting output polarizations of these waves in corresponding relationship to their optical frequency. A composite filter can therefore be obtained by combining the device with a polarizer P2 polarizing the output light L2. In the directional acoustic system each active acoustic wave is formed by a transducer integrated into the substrate and energized by a variable frequency electrical supply. This transducer emits surface acoustic waves propagating in the material of the substrate near its top face.

The output polarizer P2 can, for example, absorb or reflect optical waves polarized in one direction and transmit optical waves polarized in another direction. An analogous input polarizer P1 can be used to polarize the input light. Each of these polarizers can be dispensed with, however, the input polarizer if the input light is already polarized and the output polarizer if a device utilizing the output light is sensitive to only one polarized component of that light.

Finally, an intermediate polarizer PM is disposed at an intermediate point of the optical waveguide 6 and preferably integrated into the substrate. This polarizer delimits on the waveguide first and second interaction segments SL1 and SL2 that are symmetrical to each other, said optical waves passing through these two segments in series. First and second active acoustic waves WSA1 and WSA2 pass through these two segments, respectively, with the result that this device constitutes a first filter for linearly polarized input light and that a second filter can be obtained by associating the device with an output polarizer P2 (see above). These two filters then constitute respective successive stages of said composite filter, having respective center frequencies commanded by acoustic frequencies of these two active acoustic waves. Disposing these two stages in series enhances the contrast of the composite filter.

A device of this kind is described in the article "Reduced sidelobe integrated acousto-optic filter with birefringence apodization" L. B. Aronson, G. Rankin, W. R. Trutna, Jr., and D. W. Dolfi Oct. 15, 1993/Vol. 18 , No. 20/OPTICS LETTERS, p.1721–1723.

Figure 1:
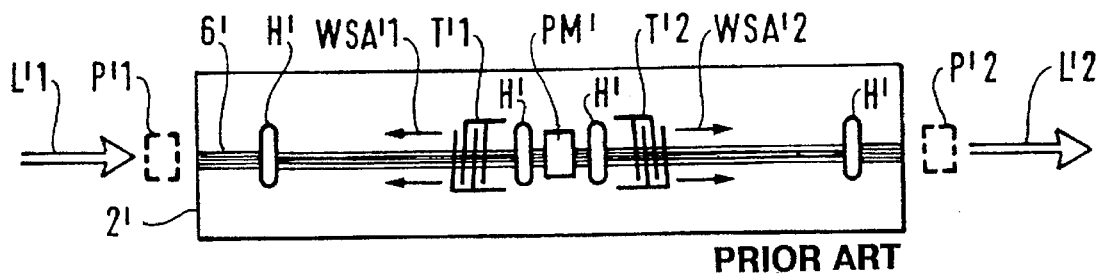
FIG. 1 shows a first prior art device.

It is shown diagrammatically in the appended FIG. 1. Its directional acoustic system includes a plurality of electro-acoustic transducers such as the transducers T'1 and T'2 in FIG. 1. These transducers generate active acoustic waves WSA'1 and WSA'2 directly. These waves propagate on the axis of the optical waveguide 6'.

This device has the drawback of a low contrast if the optical waveguides are identical and uniform. If the two waveguides are different, a situation discussed in the article, it is difficult to get the center frequencies of the two stages of the composite filter to coincide. Coincidence is needed to obtain an efficient filter in a fiber optic telecommunication system using spectral multiplexing.

In accordance with the present invention an electro-acoustic transducer T included in the directional acoustic system and energized by the energization electrical signal generates sufficient acoustic power to constitute both the first and second active acoustic waves WSA1 and WSA2, this system forming these first and second active acoustic waves by orienting and distributing this acoustic power. This orientation and this distribution have the same mutual symmetry as the first and second interaction segments. This symmetry automatically ensures that the center frequencies of the two optical filters are equal for uniform optical waveguides.

This symmetry is relative to a transverse axis D, for example, or, to be more precise, considering the thicknesses of the components below the top surface of the substrate, relative to the vertical plane defined by this axis.

The active acoustic waves could be formed in various ways.

For example, they could be formed from two opposite emitting faces of a transducer disposed at the center of the optical waveguide, between two identical components of a composite intermediate polarizer. They could instead be formed from two opposite emitting faces of a transducer disposed on the axis of symmetry at a small distance from the optical waveguide. The two beams of acoustic waves would be respectively directed towards the two interaction segments by acoustic distribution means separate from the transducer. Such means would include curved acoustic waveguides formed in the top surface of the substrate.

In accordance with the present invention, acoustic distribution means are preferably chosen to obtain apodization of the transmission spectrum of the composite filter, i.e. reduction or elimination of sidelobes either side of a main lobe defining the bandwidth of the filter.

This apodization can be obtained by an appropriate longitudinal distribution of the acoustic energy in an interaction segment. This distribution can be defined by a law of variation of the acoustic energy as a function of an abscissa measured along this segment. This law is represented by a sine squared arch for the simplest implementation using a uniform acoustic coupler as described below. If a more complex implementation of the coupler is acceptable, a Gaussian or Hamming law is preferable.

The efficiency of apodization is defined by an apodization ratio which is the ratio of the optical power in the sidelobes to that in the main lobe.

Longitudinal strips are preferably formed in the face 4 of the substrate 2 for the interaction segments SL1 and SL2, these strips having respective characteristic acoustic speeds which are the speeds at which the surface acoustic waves propagate in these strips, respectively. These strips include three acoustic return strips and two acoustic propagation strips associated with each interaction segment SL1 or SL2, the acoustic return strips having higher characteristic acoustic speeds than the adjacent acoustic propagation strips. These strips are in sequence in the transverse direction in the following order:

An auxiliary return strip BA1 or BA2 is formed in face 4 of substrate 2;

An auxiliary propagation strip BB1 or BB2 is formed in face 4 of substrate 2;

An intermediate return strip BC1 or BC2 constitutes with the auxiliary return strip and the auxiliary propagation strip an auxiliary acoustic waveguide segment GA1 or GA2 tending to confine the acoustic waves in the auxiliary propagation strip BB1, this segment being a first segment or a second segment according to whether these strips are associated with the first interaction segment or the second interaction segment, respectively.

A main propagation strip BD1 or BD2 is formed in face 4 of substrate 2; and

A main return strip BE1 or BE2 constitutes with the intermediate return strip and the main propagation strip a main acoustic waveguide segment GP1 or GP2 tending to confine the acoustic waves in the main propagation strip, this segment being a first segment or a second segment according to whether these strips are associated with the first interaction segment or the second interaction segment, respectively.

The return strips are typically formed by surface diffusion of titanium ions into the lithium niobate substrate. The width of the intermediate return strip BC1 or BC2 and its characteristic acoustic speed difference compared to the auxiliary and main propagation strips are sufficiently small to allow coupling between the auxiliary and main acoustic waveguide segments. This coupling has an acoustic coupling characteristic length. It is such that an acoustic wave 100% guided by one of these waveguide segments passes progressively into the other of these waveguide segments and is 100% guided in the latter after travelling this coupling characteristic length.

Figure 2:
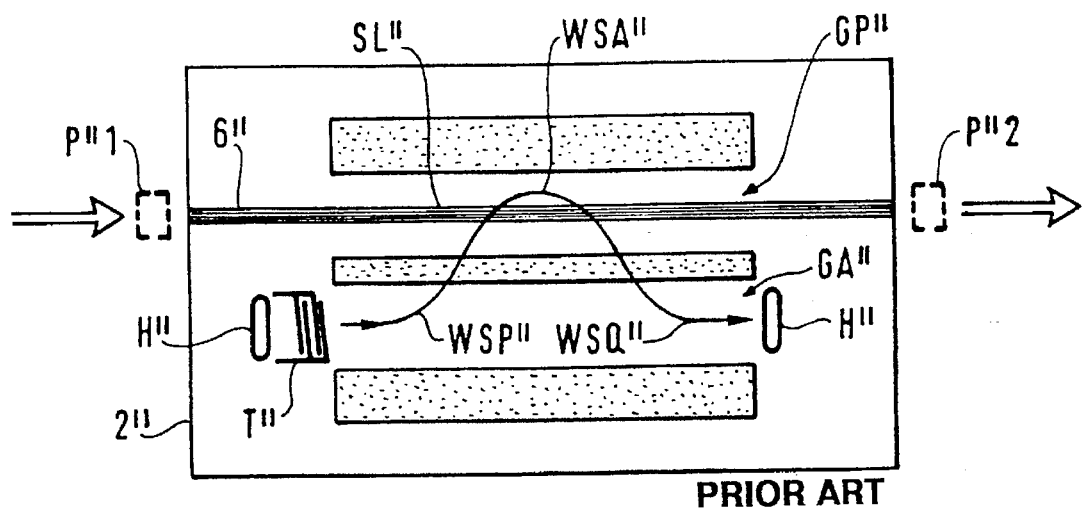
FIG. 2 shows a second prior art device.

The first and second interaction segments SL1 and SL2 extend along the axes of the first and second main acoustic waveguide segments GP1 and GP2, respectively, The transducer T injects first and second primary acoustic waves WSP1 and WSP2 into the first and second auxiliary acoustic waveguide segments GA1 and GA2 at respective first and second primary injection points. These points are constituted by the transducer T itself, for example. The coupling between the first or second auxiliary waveguide segment GA1 or GA2 and the first or second main waveguide segment GP1 or GP2 is effected over an effective acoustic coupling length substantially equal to twice said acoustic coupling characteristic length from the first or second primary injection point, respectively. As a result, this coupling first progressively transfers power from the first or second primary acoustic wave WSP1 or WSP2 into the first or second main acoustic waveguide segment to cause the first or second active acoustic wave WSA1 or WSA2 to appear therein and then progressively transfers this power back into the first or second auxiliary acoustic waveguide segment to cause this first or second active acoustic wave to disappear, respectively. The return of this power into the auxiliary waveguide segments gives rise to an acoustic wave WSQ1 or WSQ2 therein, respectively. In FIGS. 2 and 3 these transfers of acoustic power are represented by a wavy line that indicates approximately, over the length of the waveguide segment, the changing position of the barycenter of the acoustic field.

In practice the presence of the optical waveguide 6 disturbs the action of the acoustic waveguide GP and destroys the synchronism between the waveguides GP and GA. To re-establish this synchronism an optical waveguide similar to the waveguide 6 is introduced into GA, which is thus made identical to GP. This additional optical waveguide is "inert" in the sense that it does not guide any light wave. To simplify FIGS. 2 and 3 it is not shown therein.

The longitudinal distribution law obtained in this way for the intensity of the active acoustic wave brings about apodization.

Apodization has been obtained in a prior art filter in the manner just described except that a single interaction segment was used, the main and auxiliary acoustic waveguides also each incorporating only one segment. This prior art device is shown in FIG. 2.

It is described in the article "Sidelobe suppression in an acousto-optic filter with a raised-cosine interaction strength" D. A. Smith and J. J. Johnson Appl. Phys. Lett. 61 (9), 31 Aug. 1992 p 1025–1027.

It provides an apodization ratio of 17.5 dB.

The filter that can be constructed using the device of the present invention produces two apodizations in series and thus doubles the apodization ratio to 35 dB for uniform acoustic couplers.

The transducer T is preferably disposed between the first and second auxiliary acoustic waveguide segments GA1 and GA2 in an auxiliary acoustic waveguide GA including these two segments. It then emits the first and second primary acoustic waves via first and second emitting faces T1 and T2, a confusion main acoustic waveguide GP including said first and second main acoustic waveguide segments GP1 and GP2.

The device further includes an acoustic absorber 4 at each end of the auxiliary waveguide H to absorb the acoustic power transferred back into this waveguide from the main acoustic waveguide.

The optical waveguides are preferably rectilinear, said first and second emitting faces being two opposite faces of the transducer.

There is claimed:

1. Acoustic-optical device for optical filtering, including two successive acoustic-optical interaction segments separated by an intermediate polarizer and each modifying the polarization of light guided by said segment, said modification being dependent on the freqencies of interacting optical waves and acoustic waves, in which device said acoustic waves are supplied symmetrically to two interaction segments from a common electro-acoustic transducer.

2. Device according to claim 1 including:

a substrate having a face, constituting a top face of said device, an optical waveguide-extending in said top face from an input to an output to receive at said input input light made up of optical waves having the same input linear polarization and that can have different optical frequencies, to guide said waves in at least one direction and to deliver all said waves to said output in the form of output light, the direction in which said waves are guided in each part of said waveguide constituting for that part a longitudinal direction, the perpendicular direction in said top face of said substrate constituting a transverse direction, said optical waveguide being birefringent, a directional acoustic system integrated into said substrate, receiving an electrical energization signal and forming in response thereto acoustic waves propagating in said substrate and having acoustic frequencies, said waves including active acoustic waves propagating longitudinally along said optical waveguide to enable acoustic-optical interaction between said active acoustic waves and the optical waves propagating in said waveguide, each such interaction being operative between an acoustic wave having an acoustic frequency fs and an optical wave having an optical frequency Fj, said interaction leading to modification of the polarization of said optical wave without significant modification of its optical frequency, said polarization modification being dependent on said optical frequency Fj and having a maximum where said optical frequency has a predetermined relationship to said acoustic frequency, so that the optical waves of said output light can have different polarizations respectively constituting output polarizations of said waves in corresponding relationship to their optical frequencies and so that a composite filter can be constituted by associating said device with a polarizer polarizing said output light, and said intermediate polarizer disposed at an intermediate point of said optical waveguide and delimiting thereon first and second interaction segments that are mutually symmetrical, said optical waves passing in succession through said two segments, first and second active acoustic waves passing through said segments, respectively, so that said device constitutes a first filter for linearly polarized input light and so that a second filter can be constituted by association of said device and an output polarizer, said two filters then constituting two respective successive stages of said composite filter and having respective center frequencies commanded by acoustic frequencies of said two active acoustic waves, in which device said electro-acoustic transducer included in said directional acoustic system and energized by said electric energization signal generates sufficient acoustic power to constitute said first and second active acoustic waves, said system forming said first and second active acoustic waves by distributing said acoustic power, said distribution having the same mutual symmetry as said first and second interaction segments.

3. Device according to claim 2 wherein longitudinal strips are formed in said top face of said substrate for said interaction segments, said strips having respective characteristic acoustic speeds that are the speeds at which acoustic waves propagate in said strips, respectively, said strips including three acoustic return strips and two acoustic propagation strips associated with each interaction segment, said acoustic return strips having greater characteristic acoustic speeds than said adjacent acoustic propagation strips, said strips being in succession in said transverse direction in the following order:

an auxiliary return strip, an auxiliary propagation strip, an intermediate return strip constituting with said auxiliary return strip and said auxiliary propagation strip an auxiliary acoustic waveguide segment tending to confine the acoustic waves in said auxiliary propagation strip, said segment being a first or a second segment according to whether said strips are associated with said first or said second interaction segment, respectively, a main propagation strip, and a main return strip constituting with said intermediate return strip and said main propagation strip a main acoustic waveguide segment tending to confine the acoustic waves in said main propagation strip, said segment being a first or a second segment according to whether said strips are associated with said first or said second interaction segment, respectively, the width of said intermediate return strip and its characteristic speed difference relative to said auxiliary and main propagation strips being sufficiently small to allow coupling between said auxiliary and main acoustic waveguide segments, said coupling having an acoustic coupling characteristic length and being such that an acoustic wave 100% guided by one of said waveguide segments passes progressively into the other of said waveguide segments and is guided 100% in the latter after travelling said coupling characteristic length, said first and second interaction segments extending along axes of said first and second main acoustic waveguide segments, respectively, said transducer injecting first and second primary acoustic waves into first and second auxiliary acoustic waveguide segments at respective first and second primary injection points, said coupling between said first or second auxiliary waveguide segment and said first or second main waveguide segment being effected over an effective acoustic coupling length substantially equal to twice said acoustic coupling characteristic length from said first or second primary injection point, respectively, so that said coupling firstly and progressively transfers power from said first or second primary acoustic wave into said first or second main acoustic waveguide segment to cause said first or second active acoustic wave to appear therein and then progressively transfers said power back into said first or second auxiliary acoustic waveguide segment to cause said first or second active acoustic wave to disappear therein, respectively.

4. Device according to claim 3 characterized in that said transducer is disposed between said first and second auxiliary acoustic waveguide segments in an auxiliary acoustic waveguide including said two segments, said transducer emitting said first and second primary acoustic waves via first and second emitting phases, a main acoustic waveguide including said first and second main acoustic waveguide segments.

5. Device according to claim 4 further including an acoustic absorber at each end of said auxiliary acoustic waveguide to absorb the acoustic power transferred back into said waveguide from said main acoustic waveguide.

6. Device according to claim 4 wherein said optical waveguide is rectilinear, said first and second emitting faces being two opposite faces of said transducer.

* * * * *